United States Patent
Bruner et al.

(10) Patent No.: US 9,367,254 B2
(45) Date of Patent: Jun. 14, 2016

(54) ENHANCED DATA VERIFY IN DATA STORAGE ARRAYS

(71) Applicant: HGST Netherlands B.V., Amsterdam (NL)

(72) Inventors: Curtis Howard Bruner, Niwot, CO (US); Jerry Kohoutek, Berthoud, CO (US); Jeffrey Edward Mast, Loveland, CO (US)

(73) Assignee: HGST Netherlands B.V., Amsterdam (NL)

( * ) Notice: Subject to any disclaimer, the term of this patent is extended or adjusted under 35 U.S.C. 154(b) by 56 days.

(21) Appl. No.: 14/316,798

(22) Filed: Jun. 27, 2014

(65) Prior Publication Data

US 2015/0378621 A1   Dec. 31, 2015

(51) Int. Cl.
| | |
|---|---|
| G06F 13/00 | (2006.01) |
| G06F 13/28 | (2006.01) |
| G06F 3/06 | (2006.01) |
| G06F 12/08 | (2016.01) |

(52) U.S. Cl.
CPC ............ G06F 3/0619 (2013.01); G06F 3/0665 (2013.01); G06F 3/0689 (2013.01); G06F 12/0833 (2013.01); G06F 2003/0692 (2013.01); G06F 2212/62 (2013.01)

(58) Field of Classification Search
CPC ................. G06F 3/0619; G06F 3/0689; G06F 2003/0692
See application file for complete search history.

(56) References Cited

U.S. PATENT DOCUMENTS

| 8,665,545 B2* | 3/2014 | Coker ................. G11B 19/045 360/31 |
|---|---|---|
| 2005/0262400 A1 | 11/2005 | Nadeau et al. |
| 2005/0288960 A1 | 12/2005 | Sharp |
| 2013/0275653 A1 | 10/2013 | Ranade et al. |

OTHER PUBLICATIONS

Ultrastor, "Reduce Storage Costs", Retrieved on Nov. 8, 2013 at: http://www.ultrastor.com/index.php/solutions/by-application/tiered-storage, 2 pages.
Mendoza, Adam, Intel Corporation, "Cold Storage in the Cloud: Trends, Challenges, and Solutions", Retrieved at: http://www.intel.com/content/dam/www/public/us/en/documents/white-papers/cold-storage-atom-xeon-paper.pdf, Revision date: Aug. 4, 2011, 8 pages.

(Continued)

Primary Examiner — Eric S Cardwell

(57) ABSTRACT

To provide enhanced operation of data storage devices and systems, various systems, methods, and software are provided herein. In a first example, a data storage system is configured to provide at least a portion of a first data storage device as a verification cache for a storage region of a second data storage device, write data for storage in the verification cache of the first data storage device and write the data for storage in the storage region of the second data storage device. The data storage system is configured to perform a verification process on the data written to the storage region after a verification trigger condition has been met. The data storage system is configured to transfer portions of the data that fail to pass the verification process from the verification cache to supersede the one or more parts of the data in the storage region.

18 Claims, 6 Drawing Sheets

(56) References Cited

OTHER PUBLICATIONS

Rydning, et al., "Technology Assessment: Cold Storage is Hot Again—Finding the Frost Point", Storage Solutions: Storage and the Cloud: Technology Assessment, IDC #241005, May 2013, Retrieved at: http://www.storiant.com/resources/Cold-Storage-Is-Hot-Again.pdf, 15 pages.

Moore, et al., "Disk and Tape Storage Cost Models", Retrieved at: https://web.archive.org/web/20130908183611/http://chronopolis.sdsc.edu/publications/assets/docs/dt_cost.pdf, Sep. 8, 2013, 4 pages.

Yan, et al., "Cold Storage Hardware Vo.5", Retrieved at: http://www.opencompute.org/assets/download/Open-Compute-Project-Cold-Storage-Specification-v0.5.pdf, Jan. 16, 2013, 13 pages.

Dell, "Dell Flash Storage", Retrieved on Nov. 7, 2013 at: http://www.dell.com/learn/us/en/04/campaigns/compellent-storage-center, 3 pages.

Krzyzanowski, Paul, "Distributed Systems Clusters: Building Scalable and Reliable Systems", Apr. 2007, Retrieved at: http://www.cs.rutgers.edu/~pxk/rutgers/notes/content/clusters.html, 11 pages.

Zhu, et al., "Reducing Energy Consumption of Disk Storage Using Power-Aware Cache Management", In Proceedings of the 10th International Conference on High-Performance Computer Architecture (HPCA-10 2004), Madrid, Spain, Feb. 14-18, 2004, Madrid, Spain, 12 pages.

\* cited by examiner

ENHANCED DATA VERIFY IN DATA STORAGE ARRAYS

TECHNICAL FIELD

Aspects of the disclosure are related to the field of digital data storage in data storage systems.

TECHNICAL BACKGROUND

Computer and network systems such as personal computers, workstations, server systems, and cloud storage systems, typically include data storage systems for storing and retrieving data. These data storage systems can include data storage devices, such as hard disk drives, solid state storage devices, tape storage devices, and other mass storage devices.

The data storage devices can be arranged in arrays to form the data storage systems, such as redundant configurations or striped configurations to enhance reliability, speed, or availability characteristics of the individual storage devices. These arrays can include one or more data storage devices, such as hard disk drives (HDDs) that are managed by a controller or software process. Some examples of arrayed storage configurations include Redundant Array of Independent Disk (RAID) arrays, mirrored configurations, and spanning configurations.

In addition to arrayed storage configurations, storage systems can also include archival storage configurations. These archival configurations can include "cold storage" configurations which attempt to maximize storage space of data storage devices by writing some data to higher density storage. This cold storage data can include data less frequently used than other data, or data that is desired to be saved for long-term storage. However, the cold storage of data can experience reduced storage throughput.

OVERVIEW

To provide enhanced operation of data storage devices and systems, various systems, methods, and firmware are provided herein. In a first example, a data storage system is presented. The data storage system includes a communication interface configured to receive data for storage in a data storage array comprising a plurality of data storage devices. The data storage system also includes a processing system configured to identify at least a portion of a first data storage device as a verification cache for a storage region of a second data storage device, write the data for storage in the verification cache of the first data storage device and write the data for storage in the storage region of the second data storage device. The processing system is configured to perform a verification process on at least the data written to the storage region of the second data storage device after a verification trigger condition has been met, and identify one or more parts of the data in the storage region of the second data storage device that fail to pass the verification process. Responsive to the one or more parts of the data that fail to pass the verification process, the processing system is configured to transfer the one or more parts of the data from the verification cache of the first data storage device to supersede the one or more parts of the data in the storage region of the second data storage device.

In another example, a method of operating a data storage system is presented. The method includes receiving data for storage in a data storage array comprising a plurality of data storage devices, identifying at least a portion of a first data storage device as a verification cache for a storage region of a second data storage device, writing the data for storage in the verification cache of the first data storage device and writing the data for storage in the storage region of the second data storage device. The method also includes performing a verification process on at least the data written to the storage region of the second data storage device after a verification trigger condition has been met, and identifying one or more parts of the data in the storage region of the second data storage device that fail to pass the verification process. Responsive to the one or more parts of the data that fail to pass the verification process, the method includes transferring the one or more parts of the data from the verification cache of the first data storage device to supersede the one or more parts of the data in the storage region of the second data storage device.

In another example, a data storage system is presented. The data storage system includes a storage application configured to receive data for storage in a cold storage file system, the cold storage file system comprising one or more data storage devices presented as a virtual storage device that spans the one or more data storage devices. The data storage system also includes a storage mapper configured to establish a storage map data structure that maps a first region in a first data storage device as a verification cache for a cold storage region of a second data storage device and maps a second region of the second data storage device as a verification cache for a cold storage region of the first data storage device. Responsive to receiving the data, the storage mapper is configured to select the cold storage region of the second data storage device for storage of the data, transfer the data for caching in the verification cache of the first data storage device, and transfer the data for storage in the cold storage region of the second data storage device. After at least further data is stored in the cold storage region of the second data storage device, the storage mapper is configured to perform a verification process on at least the data written to the cold storage region of the second data storage device, and identify one or more parts of the data in the cold storage region of the second data storage device that fail to pass the verification process. Responsive to the one or more parts of the data that fail to pass the verification process, the storage mapper is configured to transfer the one or more parts of the data from the verification cache of the first data storage device to supersede the one or more parts of the data in the cold storage region of the second data storage device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
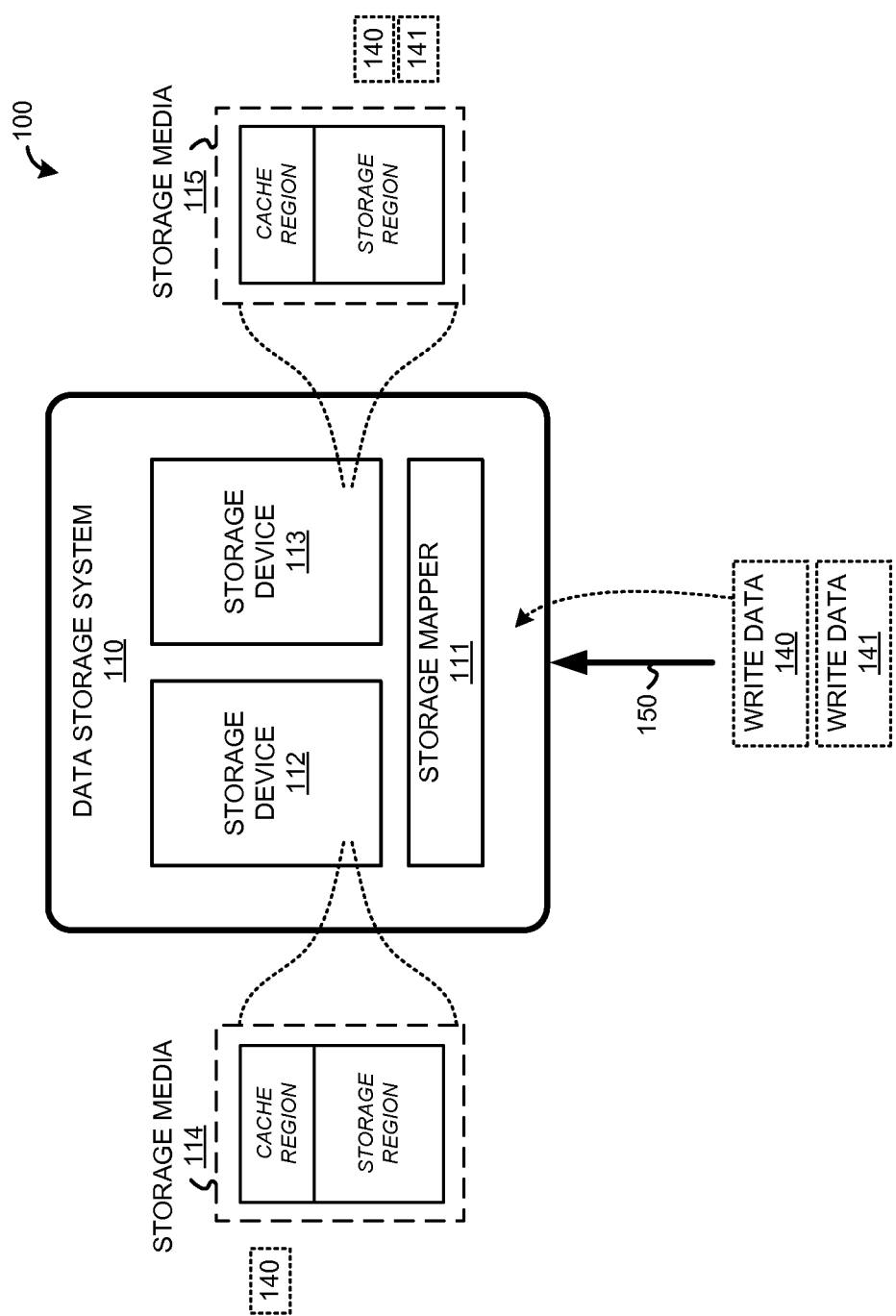
FIG. 1 is a system diagram illustrating a data system.

FIG. 1 is a system diagram illustrating data system 100. System 100 includes data storage system 110 which receives file transactions over at least link 150. These file transactions can include read commands, write commands, metadata retrieval commands, among other file handling commands. In some examples instead of file transactions, object-level transactions are employed. Data storage system 110 includes at least two data storage devices, namely storage devices 112-113. Data storage system 110 also includes storage mapper 111, although further elements can be included in data storage system 110, including variations thereof.

In this example, data storage system 110 includes at least two data storage devices, namely data storage devices 112-113. Data storage system 110 can abstract the individual storage devices and present the data storage devices as a single storage space, such as virtual storage drive that spans more than one data storage device. Data storage system 110 can also include any number of communication interfaces for receiving file or object transactions over storage link 150. These interfaces can include network interfaces, storage interfaces, packet interfaces, or other communication links, including combinations thereof.

Each storage device 112-113 includes associated storage media 114-115. which are subdivided into associated cache regions and storage regions. The cache regions and storage regions of each particular storage device reside on the same storage media of the storage device in this example, such as a rotating magnetic storage media of a HDD. Other storage media can be employed in storage devices 112-113, and the cache regions can be included in other storage media, such as separate solid state storage media or separate rotating magnetic storage media. Other combinations of storage media can be employed.

In operation, data storage system 110 receives data for storage on storage media associated with data storage system 110, such as responsive to write operations received over storage link 150. These write operations can include data to be stored by data storage system 110. Read operations can also be handled by data storage system 110, such as by retrieving data already stored in any of storage devices 112-113 and return of the requested data over storage link 150. Other file operations or object operations can be handled by data storage system 110, such as delete operations, rename operations, copy operations, metadata operations, and the like.

Figure 2:
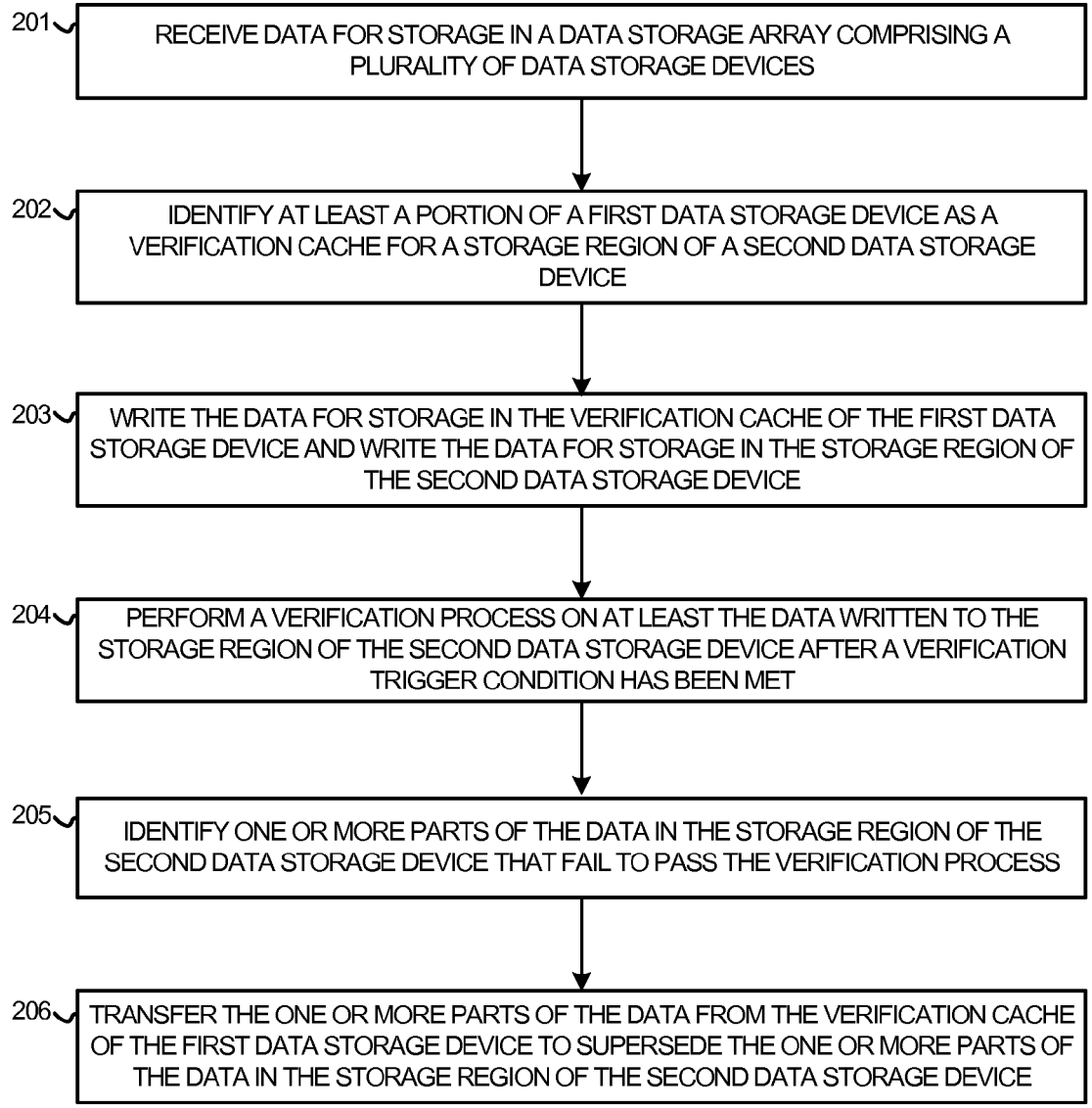
FIG. 2 is a flow diagram illustrating a method of operation of a data storage system.

To further illustrate the operation of data system 100, FIG. 2 is provided. FIG. 2 is a flow diagram illustrating a method of operating data storage system 110. The operations of FIG. 2 are referenced below parenthetically. In FIG. 2, data storage system 110 receives (201) data for storage in a data storage array comprising a plurality of data storage devices. The data is received over storage link 150, and in this example comprises write data 140. Write data 140 can accompany a write transaction which can include a write command, write operations, modify operations, or other file or object transactions.

Data storage system 110 include storage mapper 111. Storage mapper 111 identifies (202) at least a portion of a first data storage device as a verification cache for a storage region of a second data storage device. In this example, storage mapper 111 identifies the cache region of storage device 112 as a verification cache for the storage region of storage device 115. Storage mapper 111 can maintain a data structure that indicates which regions of the various storage devices are employed for cache regions and storage regions. Storage mapper 111 can also include a logical block record that indicates where in each respective storage device particular data is stored, such as a table that indicates storage locations on storage media for each file or object stored in data storage system 110. Responsive to receiving write data 140, storage mapper 111 can update the associated data structures to indicate where write data 140 is stored among the various storage media of data storage system 110. File or object allocation information can instead be stored in data structures maintained by other elements of data storage system 110, such as file systems.

Storage mapper 111 writes (203) the data for storage in the verification cache of the first data storage device and write the data for storage in the storage region of the second data storage device. In this example, storage mapper 111 writes write data 140 into both the cache region of storage device 112 and the storage region of storage media 113, as indicated by the "140" indicators in FIG. 1. Typically, a verification process is performed responsive to writing data to storage media. This verification process can include a Forward Error Correction (FEC) process or checking an error correcting code (ECC) of the data, among other verification processes. However, in this example, responsive to writing data 140, data storage system 110 does not perform a verification process on data 140, and instead waits for a verification trigger condition.

Data storage system 110 performs (204) a verification process on at least data 140 written to the storage region of storage device 113 after a verification trigger condition has been met. The verification trigger condition can include various factors. In a first example, the verification trigger condition is met when further data is written to the storage region of storage device 113. In another example, the verification trigger condition is met when further data is written to an adjacent storage location as data 140 in the storage region of storage device 113. This further data can include write data 141 which is received after write data 140 and written to the storage area of storage device 113 after write data 140. In other examples, the verification trigger can include filling a sub-region of the storage region of storage device 113. The sub-region can be a storage band among a plurality of storage bands that the storage region of storage device 113 is sub-divided into. Data can be written into a particular storage band without verification, and once the storage band has filled with data then the verification process can be performed on the entire storage band. In other examples, data is written to a series of adjacent tracks on a rotating magnetic media. In examples of adjacent tracks, once first data is written to a first track then verification for the first data occurs only after second data is written to a second track adjacent to the first track. Other verification trigger conditions can be employed, such as those discussed below regarding FIGS. 3-6.

Data storage device 110 identifies (205) one or more parts of data 140 in the storage region of storage device 113 that fail to pass the verification process. Failure to pass the verification process can include error checking failures, failure to correct single bit errors, any bit errors found, or other data verification errors for data 140 that has been stored in the storage region of storage device 113. In some examples, no verification errors are found, and operation 206 can be omitted.

Responsive to identifying one or more parts of data 140 that fail to pass the verification process, data storage system 110 transfers (206) the one or more parts of data 140 from the verification cache of storage device 112 to supersede the one or more parts of data 140 in the storage region of storage device 113. The verification cache of storage device 112 is included in the cache region of storage device 112 and is used in this example to hold data 140 until data 140 has been verified in the storage region of storage device 113. Verification of data 140 in the verification cache of storage device 112 can occur normally, but verification is not required for data 140 in the verification cache of storage device 112.

Since data 140 does not get verified immediately after writing data 140 on storage media 115, errors might have occurred during the storage of data 140. Also, if further data, such as write data 141, is stored to storage media 115 after data 140, portions of data 140 might get corrupted by the write process for data 141. This corruption can occur when data is stored in the storage region of storage device 113 in a tight or closely spaced manner, or if data 141 is written to adjacent storage locations to data 140. A closely spaced storage configuration can include a shingled magnetic recording (SMR) arrangement, with subsequent tracks of data stored in a tight and overlapping arrangement to increase storage density.

Responsive to detecting errors in data 140 as stored in the storage region of storage device 113, the erroneous portions of data 140 can be replaced or superseded by associated portions held in the verification cache of storage device 112. In some examples, the superseding portions of data 140 are transferred to storage device 113 to overwrite data 140 in storage device 113. In other examples, existing portions of data 140 in the storage portion of storage device 113 which experience errors are marked as deleted and the replacement portions of data 140 transferred from the verification cache of storage device 112 are appended to the storage region of storage device 113. This appending of replacement data can occur at a 'tail' or current storage location of the storage region of storage device 113.

Figure 3:
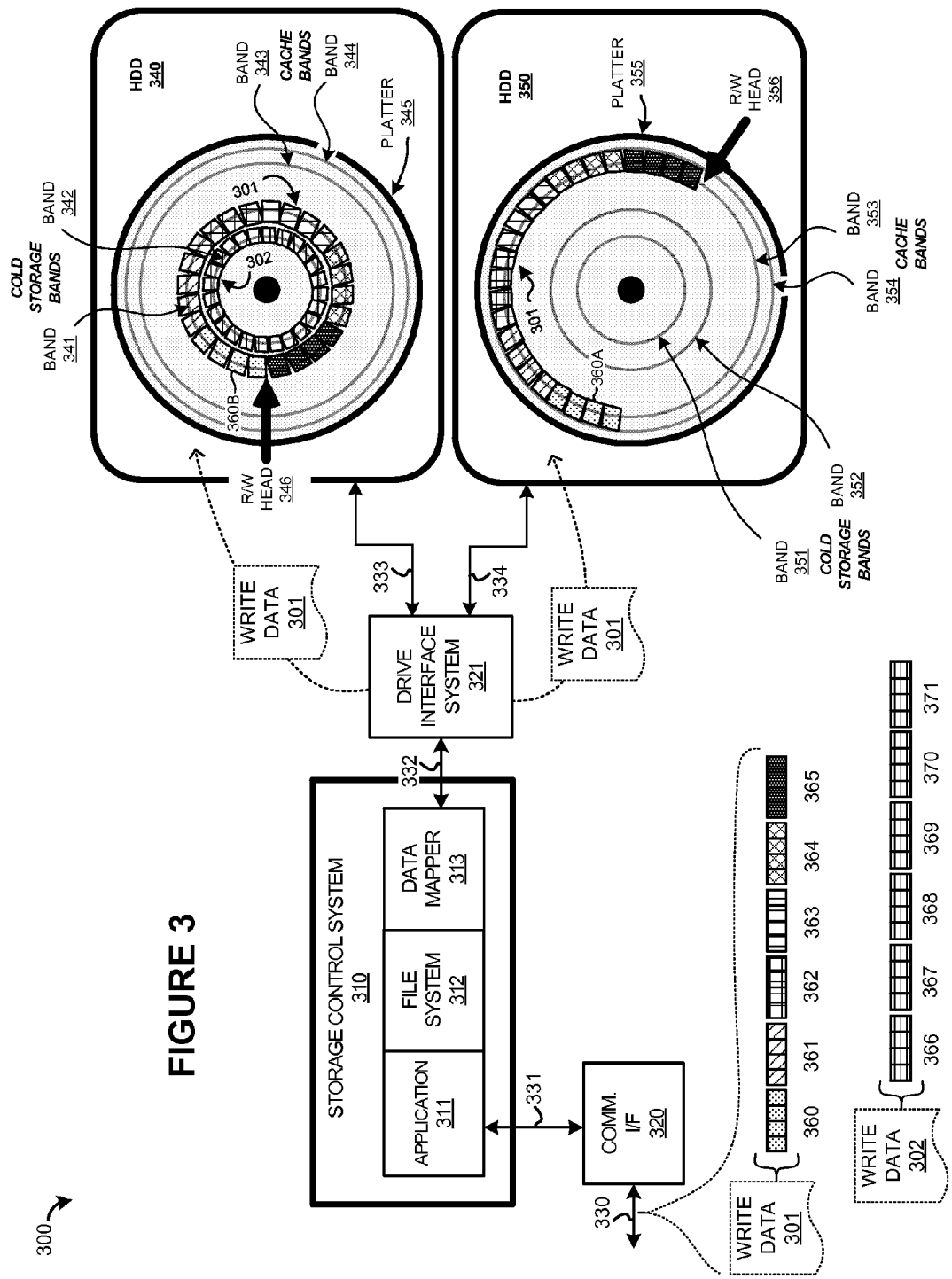
FIG. 3 is a block diagram illustrating a data system.

A further example of data storage systems are included in FIG. 3. FIG. 3 is a system diagram illustrating data system 300. Data system 300 includes storage control system 310, communication interface 320, drive interface system 321, and HDDs 340 and 350. FIG. 3 only includes two HDDs for clarity, but it should be understood that a greater number of HDDs can be included, with the operations discussed below applied across more than two HDDs or other storage drive types.

Communication interface 320 and storage control system 310 communicate over link 331 which comprises a network link in this example, such as Ethernet, Internet Protocol, or other communication links. Storage control system 310 and drive interface system 321 communicate over link 332 which can include one or more links, such as network links, storage interface links, chip interconnect, Peripheral Component Interconnect (PCI), PCI express (PCIe), or other communication links. Drive interface system 321 and HDD 340 communicate over storage link 333. Drive interface system 321 and HDD 350 communicate over storage link 334. Storage links 333 and 334 can each comprises any storage or disk interface, such as Serial Attached ATA (SATA), Serial Attached SCSI (SAS), Fibre Channel, Universal Serial Bus (USB), SCSI, or other storage or peripheral interfaces, including variations and combinations thereof. Network link 330 can interface with one or more networks, such as packet networks, the Internet, or other data and packet networks, including combinations thereof.

In operation, data system 300 comprises a data storage system for storing user data in one or more storage media for archival and later retrieval. Data files or data objects can be received over network link 330 by communication interface 320. These data files or data objects can be transferred by end user devices, such as servers, software processes, computing systems, portable devices, and the like. Data files or data objects can be stored on any of HDD 340 and 350.

The data storage elements of FIG. 3 can comprise a cold storage data system for handling storage within a cold storage file system (CSFS). The CSFS can include a user interface that allows user devices and user software applications to interact with the CSFS. The elements of FIG. 3 can illustrate storage elements for a Network File System (NFS) or Distributed File System (DFS) in other examples.

Storage control system 310 can include further communication interfaces, network interfaces, processing systems, computer systems, microprocessors, storage systems, storage media, or some other processing devices or software systems, and can be distributed among multiple devices. Examples of storage control system 310 can include software such as an operating system, logs, databases, data structures, utilities, drivers, networking software, and other software stored on a computer-readable medium. Communication interface 320 can include network interfaces, network interface cards, transceivers, wired, optical, or wireless communication equipment, among other equipment. Drive interface system 321 includes one or more integrated circuits, microprocessors, microcontrollers, transceivers, communication link interface equipment and circuitry, connectors, and other equipment. In some examples, any of communication interface 320 and drive interface system 321 are integrated into storage control system 310. HDD 340 and 350 are rotating magnetic storage drives. Each of HDD 340 and 350 includes one or more storage media represented by associated platter 345 and 355. Each of HDD 340 and 350 includes at least one associated read-write (R/W) head 346 and 356 for reading and writing data to the magnetic media of the respective HDD. HDD 340 and 350 can also each include processors, interface equipment, memory, firmware, preamps, amplifiers, signal processors, armatures, heads, enclosures, and other circuitry and equipment.

Figure 4:
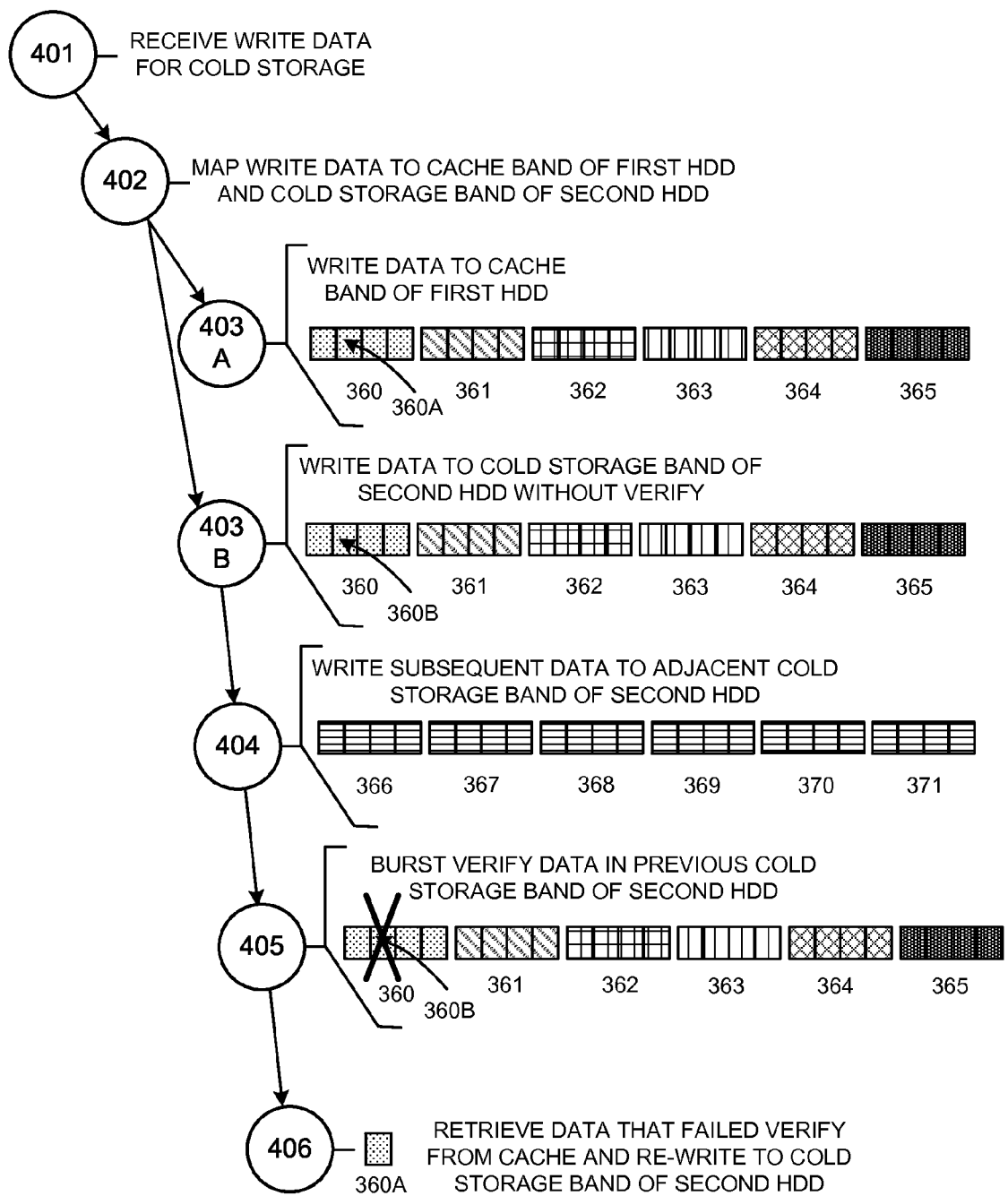
FIG. 4 is a sequence diagram illustrating a method of operation of a data storage system.

FIG. 4 is presented to further illustrate the operation of FIG. 3. FIG. 4 is a sequence diagram illustrating a method of operation of storage control system 310. The operations of FIG. 4 are referenced below parenthetically. In FIG. 4, data is written for cold storage by storage control system 310. The cold storage can indicate an archived or high density storage configuration, such as a shingled magnetic recording (SMR) arrangement employed on at least a portion of HDD 340 and 350. The cold storage features of data system 300 can be presented to a user or end user device through a Cold Storage File System (CSFS) which allows data to be stored in a high-density configuration.

The CSFS can be presented by application 311 and file system 312 to a user over link 331 and communication interface 320. The storage of data system 300 can be presented as a virtual drive to an end user, where the virtual drive can abstract any number of physical storage drives or storage spaces and present a user with a single volume of storage, which is accessible over link 330. Write, read, delete, modify, and other data file or data object operations can be initiated by end users and handled by storage control system 310.

In a first example file operation, communication interface 320 receives (401) write data 301 for cold storage by data system 300. This write data 301 is shown as composed of many "blocks" of data in FIG. 3, which represent a plurality of bytes of data. The amount of data included in write data 301 can vary, and the example shown in FIG. 3 has six groups of data. Communication interface 320 transfers the received write data 301 also with any associated write commands or write operation information to application 311.

Application 311 can include any user interface or software interface that a user device or external data system can interface with to instruct data system 300 to perform the various storage operations. Application 311 can include a web interface, application programming interface (API), software application, operating system, user application, or other software, including combinations and variations thereof. In many examples, application 311 is presented to a user device or external system through communication interface 320 and link 330. For example, application 311 can be a user interface or API while communication interface 320 can be a network stack used for exchanging data packets with user devices or external systems over link 330.

Application 311 can communicate with file system 312 to perform data file or data object operations, such as those mentioned above. File system 312 can be a CSFS, a network file system (NFS), or a distributed file system (DFS), among other file systems, including combinations thereof. The file system can track data file or data object allocations so an operating system, application, or other user-level software process can access data stored by any of HDD 340 or 350.

File system 312 communicates with data mapper 313 to actually store data onto various storage devices, such as HDD 340 or 350. Data mapper 313 determines which HDD to use for data storage for each data piece, such as for a particular file or object transaction. Data mapper 313 can perform load balancing analysis to identify one of HDD 340 and 350 on which to write data. This load balancing can include round-robin load balancing to alternatively select different HDDs for each transaction. This load balancing can include monitoring a busy or idle state of the HDDs and distribute the write transaction to a HDD which is not in a busy state or which is in an idle state. The busy state can include a HDD presently writing, reading, or verifying data, while the idle state can include a HDD not presently writing, reading, or verifying data. In further examples, the load balancing includes monitoring a current position of a read-write head or read head of a HDD and processing the current head position against a desired write or read location to prevent unwanted head seek and tracking operations and delays.

In FIG. 4, data mapper 313 maps (402) write data 301 to a cache band of a first HDD and to a cold storage band of a second HDD. The mapping can include determining physical locations on each HDD for writing of data 301, or can include logical address mapping for data 301 on each HDD.

As seen in FIG. 3, the storage media for each HDD is divided into at least two regions. A first region includes cache bands, and a second region includes cold storage bands. A band includes one or more tracks of a particular HDD. For example, a platter 345 of HDD 340 includes a plurality of circular tracks for storing data on the magnetic media of HDD 340. These tracks subdivide the physical media into subportions which are addressable for data storage by a system which interfaces with HDD 340. The tracks of HDD 340 are grouped into bands, and HDD 340 can include any number of bands which include any number of tracks. Each band is composed of a sequential storage space on the physical media, such as a sequential number of tracks. The cache bands are positioned on outer edges of the respective platters, while the cold storage bands are positioned on inner edges of the respective platters. The cache bands are larger diameter tracks than the cold storage bands. Typically, tracks near the outside edge of a platter move with a faster angular speed with respect to a write or read head than tracks near the inside edge. HDD 350 includes a similar configuration as mentioned above for HDD 340.

Thus, for HDD 340, cache bands 343-344 are positioned near an outer edge of platter 345, while cold storage bands 341-342 are positioned near an inner edge of platter 345. For HDD 350, cache bands 353-354 are positioned near an outer edge of platter 355, while cold storage bands 351-352 are positioned near an inner edge of platter 355. Although only two cache bands and two storage bands are illustrated for each of HDD 340 and 350, it should be understood than any number of bands can be included. Also, the cold storage bands of a HDD can be designated as "user space" or a "user region" of the HDD which is accessible as addressable storage space for an end user or external system which reads and writes data to the storage space provided by storage control system 310. Also, the cache bands of a HDD can be designated as "vendor space" or "vendor regions" of the HDD which are not accessible as addressable storage space for an end user. This vendor regions can be hidden from a user-accessible file system, such as the CSFS discussed herein.

The cache bands of HDD 340 are employed as a verification cache for the cold storage bands of HDD 350. Likewise, the cache bands of HDD 350 are employed as a verification cache for the cold storage bands of HDD 340. Although two HDDs are employed in FIG. 3, it should be understood that the cache bands and cold storage bands can be employed on more than two HDDs and a single verification cache can be employed for the cold storage areas of more than one HDD. Likewise, although HDDs are shown in FIG. 3, the examples herein can be applied to any data storage device, including solid state storage devices, optical storage devices, phase change storage devices, and other types of magnetic storage devices, including magnetic random access memory (MRAM).

When write data is received (401), such as write data 301, data mapper 313 maps (402) data 301 into a verification cache and into a cold storage area. Once data mapper 313 determines onto which HDD data is to be cached and stored, then this data is concurrently written (403A, 403B) onto the respective HDDs. As seen in FIG. 3, write data 301 is transferred by storage control system 310 for storage in band 341 of HDD 340 and for storage in band 353 of HDD 350. Band 341 is a cold storage band in this example, while band 353 is a cache band in this example. The transfer of write data 301 to both HDD 340 and HDD 350 can be concurrent or can be sequential, however, data 301 is stored in different locations on separate HDDs.

After data 301 has been written to the cold storage region of HDD 340, a verification process is not performed until a verification trigger condition occurs. Typically, when data is written to a HDD, the data is verified, such as by performing an ECC check on the data just written. However, when a rotating magnetic medium is employed, such as in HDD 340, a read-write head first writes the data to the magnetic medium and then a read head reads the just-written data to perform the verification process. This write-read-verify process can take considerable time, especially when the read-write head that just completed writing data is in an undesirable angular position after the write process. The read process using a read head might require a full or partial rotation of the rotating storage medium before a verify process can occur, which disrupts write operation of the associated HDD. When many writes are desired to occur in a short amount of time, such as in burst writing, this verify process can be disruptive. Also, when cold storage techniques employ tight track spacing (such as SMR), repositioning a read-write head after every write can lead to slow performance and difficulty in head positioning.

In some examples, the verification trigger can be an activity level of the HDD that is employed for cold storage. For example, when HDD 340 is writing data into cold storage bands, an activity level can be considered as busy, and a verification process is not performed, even if several unrelated write transactions are handled by HDD 340. Once HDD 340 enters an idle mode, such as when not performing any writes to the cold storage bands of HDD 340, then a verification process can occur for any data that has not yet been verified.

However, in this example, the verification trigger condition includes further data written to an adjacent band as data 301. For example, data 302 can be received by communication interface 330 for storage by data system 300. As with data 301, data 302 can be mapped to any of HDD 340 and 350 for cold storage and verification caching. Assuming in this example that data 302 is written to a cold storage band which is adjacent to the cold storage band that data 301 was written to, then the verification trigger condition can be met. Specifically, data 301 is shown as written to band 341, while data 302 is written to band 342, which is adjacent to band 341. Although band 342 is shown as an inward band from band 341, other configurations are possible.

In SMR arrangements, adjacent data tracks are tightly spaced and many times written in a track-sequential manner to provide for some overlap in the write process. For example, a first track can be written with first data, and then a second track —inward of the first track—can be written with second data. These two SMR tracks can be spaced closer than other writing arrangements, such as perpendicular magnetic recording (PMR) arrangements, and thus a higher capacity of a storage medium can be achieved. However, the writing of subsequent data to a track that is closely spaced to a previously written track might cause corruption in the data previously stored. Thus, in this example writing of data to an adjacent band can trigger the verification process. Although storage bands are employed in this example which may have many tracks, similar processes can be applied to track-by-track verification.

Storage control system 310 burst verifies (405) data 301 in cold storage band 342 after writing of data into band 342 of HDD 340. The verify process can include reading data 301 from band 341 and performing a verification process on the data to ensure data integrity. The verification process can include an ECC process, a checksum process, a forward error correction (FEC) process, among other data integrity checks and processes.

In this example, a part of data 301 is shown to fail the verification process. Specifically, data 360B is shown to have an error during the verification process, such as a bit error or multi-bit error. Responsively, storage control system 310 retrieves (406) the part of data 301 that failed the verify process from the verification cache and re-writes this data part to the cold storage area of HDD 340 to replace the data with the error. In this example, data 360A is read from cache band 353 of HDD 350 and transferred for storage in HDD 340 to replace data 360B.

The replacement process can be handled in various ways. In a first example, data 360A is overwritten directly to the location where data 360B is located. In a second example, a file allocation table or other data structure in storage control system 310 that tracks where on HDD 340 that data is stored is updated with a new storage location and data 360A is written to that new storage location. The new storage location can be a present location of R/W head 346, or can be to a tail end of any cold storage bands or tracks that are presently used for storing data. For example, when data is written in a burst manner into cold storage bands of HDD 340, then any replacement data is written to the present burst location, which can include a different cold storage band than that of the rest of data 301. In further examples, the replacement of data 360B by data 360A is delayed until another write is to be performed in cold storage bands of HDD 340 which is prompted by incoming data received over link 330.

Once the verification process has completed and data has been verified in the cold storage bands, then any corresponding data held in the verification cache can be purged, such as by deleting the verified data from the verification cache. Data that is re-written into a cold storage band to replace data that experienced errors can be re-verified at a later time, such as during a subsequent verification process. Data that has yet to be verified can remain in the verification cache.

Thus, the cache bands of HDD 350 are used as a verification cache for data written to the cold storage area of HDD 340. HDD 340 can burst many writes to the cold storage bands without any verification of the data written during the burst writing. Meanwhile, the same data that is being written to the cold storage areas of HDD 340 is also being cached in the verification cache of HDD 350. The verification cache is used when a subsequent verification process for data written to HDD 340 fails or has errors detected therein. Likewise, the cache bands of HDD 340 can be employed as a verification cache for cold storage bands of HDD 350 in a reciprocal manner. When further HDDs are employed, then different arrangements and distributions of verification caches and cold storage areas can be employed. For example, a single verification cache can be employed for cold storage areas of two or more HDDs.

The cache bands of each HDD are also typically located on the outermost tracks of an associated HDD. The outermost tracks are typically faster for data storage due to the geometric relationship of a circular platter with an associated R/W head. Also, the cache bands might not employ a high-density storage arrangement such as SMR, and instead might employ a perpendicular magnetic recording (PMR) arrangement. The PMR arrangement can be more reliable than the SMR arrangement due to less stringent spacing of adjacent tracks.

Figure 5:
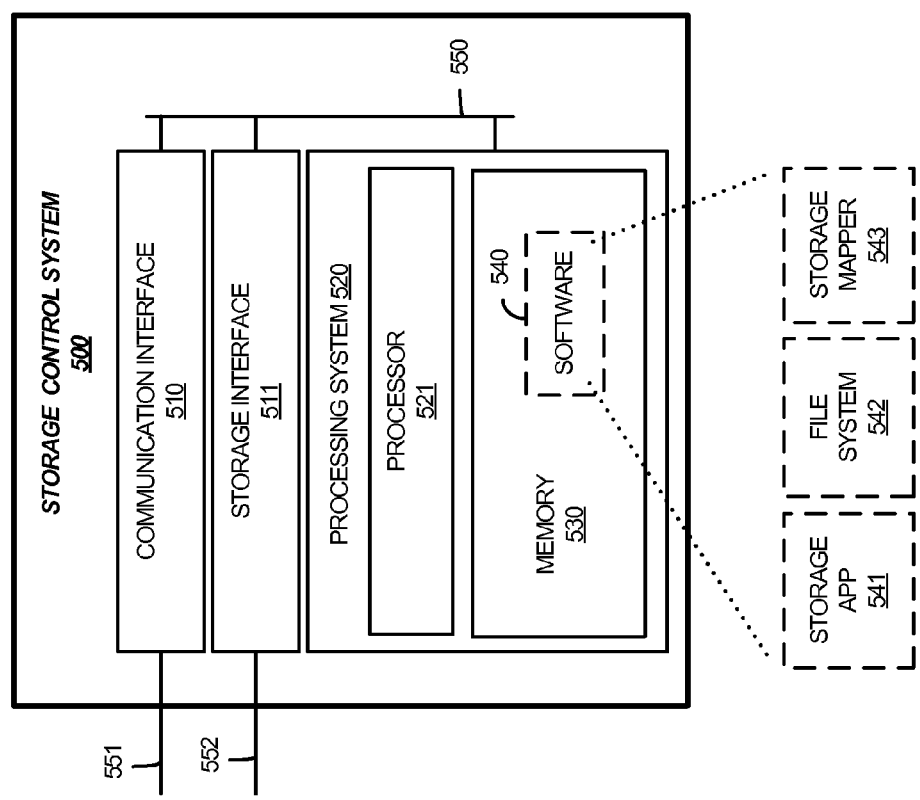
FIG. 5 is a block diagram illustrating a storage control system.

As a further example of a storage control system, FIG. 5 is presented. FIG. 5 include storage control system 500, which can be an example of storage control system 310, communication interface 320, and drive interface system 321 of FIG. 3, or can be an example of elements of data storage system 110 of FIG. 1.

Storage control system 500 includes communication interface 510, storage interface 511, processing system 520, and memory 530. The elements of storage control system 500 communicate over bus 550, although discrete links can instead be employed. Storage control system 500 can be distributed or consolidated among equipment or circuitry that together forms the elements of storage control system 500. Storage control system 500 can optionally include additional devices, features, or functionality not discussed here for purposes of brevity.

Communication interface 510 includes one or more network interfaces for communicating over communication networks, such as the IP networks or packet networks discussed herein. The network interfaces can include an Ethernet interface, IP interface, or other local or wide area network communication interfaces which can communicate over a communication link. Examples of communication interface 510 include network interface card equipment, transceivers, modems, and other communication circuitry. In this example, communication interface 510 communicates over network link 551. Network link 551 can include any communication network links as described herein.

Storage interface 511 includes one or more storage interfaces for communicating with storage drives, such as hard disk drives, flash drives, phase change memory drives, and the like. Storage interface 511 can comprise transceivers, interface circuitry, connectors, buffers, microcontrollers, and other interface equipment. Storage link 552 can comprise any number of wired, optical, or wireless storage or disk links, such as Serial Attached ATA (SATA), Serial Attached SCSI (SAS), Fibre Channel, Infiniband, Universal Serial Bus (USB), SCSI, Ethernet, IP, or other storage or peripheral interfaces, including variations and combinations thereof.

Processing system 520 includes processor 521 and memory 530. Processor 521 can comprise one or more microprocessors and other circuitry that retrieves and executes software 540 from memory 530. Processing system 520 can be implemented within a single processing device but can also be distributed across multiple processing devices or sub-systems that cooperate in executing program instructions. Examples of processing system 521 include general purpose central processing units, application specific processors, and logic devices, as well as any other type of processing device, combinations, or variations thereof.

Memory 530 can comprise any non-transitory computer readable storage media readable by processing system 521 and capable of storing software 540. Memory 530 can include volatile and nonvolatile, removable and non-removable media implemented in any method or technology for storage of information, such as computer readable instructions, data structures, program modules, or other data. In addition to storage media, in some implementations memory 530 can also include communication media over which software 540 can be communicated. Memory 530 can be implemented as a single storage device but can also be implemented across multiple storage devices or sub-systems co-located or distributed relative to each other. Memory 530 can comprise additional elements, such as a controller, capable of communicating with processing system 521. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media.

Software 540 can be implemented in program instructions and among other functions can, when executed by storage control system 500 in general or processing system 520 in particular, direct storage control system 500 or processing system 520 to operate as described herein. Software 540 can include additional processes, programs, or components, such as operating system software, database software, or application software. Software 540 can also comprise firmware or some other form of machine-readable processing instructions executable by processing system 520.

In at least one implementation, the program instructions can include first program instructions that direct processing system 520 to, receive data for storage in a data storage array comprising a plurality of data storage devices, identify at least a portion of a first data storage device as a verification cache for a storage region of a second data storage device, write the data for storage in the verification cache of the first data storage device, write the data for storage in the storage region of the second data storage device, perform a verification process on at least the data written to the storage region of the second data storage device after a verification trigger condition has been met, and identify one or more parts of the data in the storage region of the second data storage device that fail to pass the verification process. Responsive to the one or more parts of the data that fail to pass the verification process, the program instructions can direct processing system 520 to transfer the one or more parts of the data from the verification cache of the first data storage device to supersede the one or more parts of the data in the storage region of the second data storage device, among other operations.

In another example implementation, the program instructions can include storage application module 541, file system module 542, and storage mapper module 543 are included in software 540, such as shown in FIG. 5, that direct processing system 520 to operate accordingly. Application module 541 can provide a user application or application programming interface to external systems which can access the storage spaces controlled by storage control system 500. External system or user devices can write data, read data, among other file or object operations through an application or API presented by application module 541. Application module 541 can also receive these file or object operations and transfer to file system module 542. File system module 542 can provide a file system arrangement for storage devices managed by storage control system 500, such as a Cold Storage File System, NFS, or DFS as discussed herein. File system module 542 can present any number of discrete storage devices or storage drives as a virtual single volume to application module 541, such as when a file system spans multiple hard drives. File system module 542 can maintain one or more data structures, such as tables, databases, hash tables, heaps, and the like, which can relate storage locations on individual storage devices to files and objects. Storage mapper module 543 handles distributing write data across various storage drives using verification caches and cold storage regions as discussed herein. Storage mapper module 543 can perform load balancing operations to distribute the write data across any number of storage devices.

In general, software 540 can, when loaded into processing system 520 and executed, transform processing system 520 overall from a general-purpose computing system into a special-purpose computing system customized to operate as described herein. Encoding software 540 on memory 530 can transform the physical structure of memory 530. The specific transformation of the physical structure can depend on various factors in different implementations of this description. Examples of such factors can include, but are not limited to the technology used to implement the storage media of memory 530 and whether the computer-storage media are characterized as primary or secondary storage. For example, if the computer-storage media are implemented as semiconductor-based memory, software 540 can transform the physical state of the semiconductor memory when the program is encoded therein. For example, software 540 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 6:
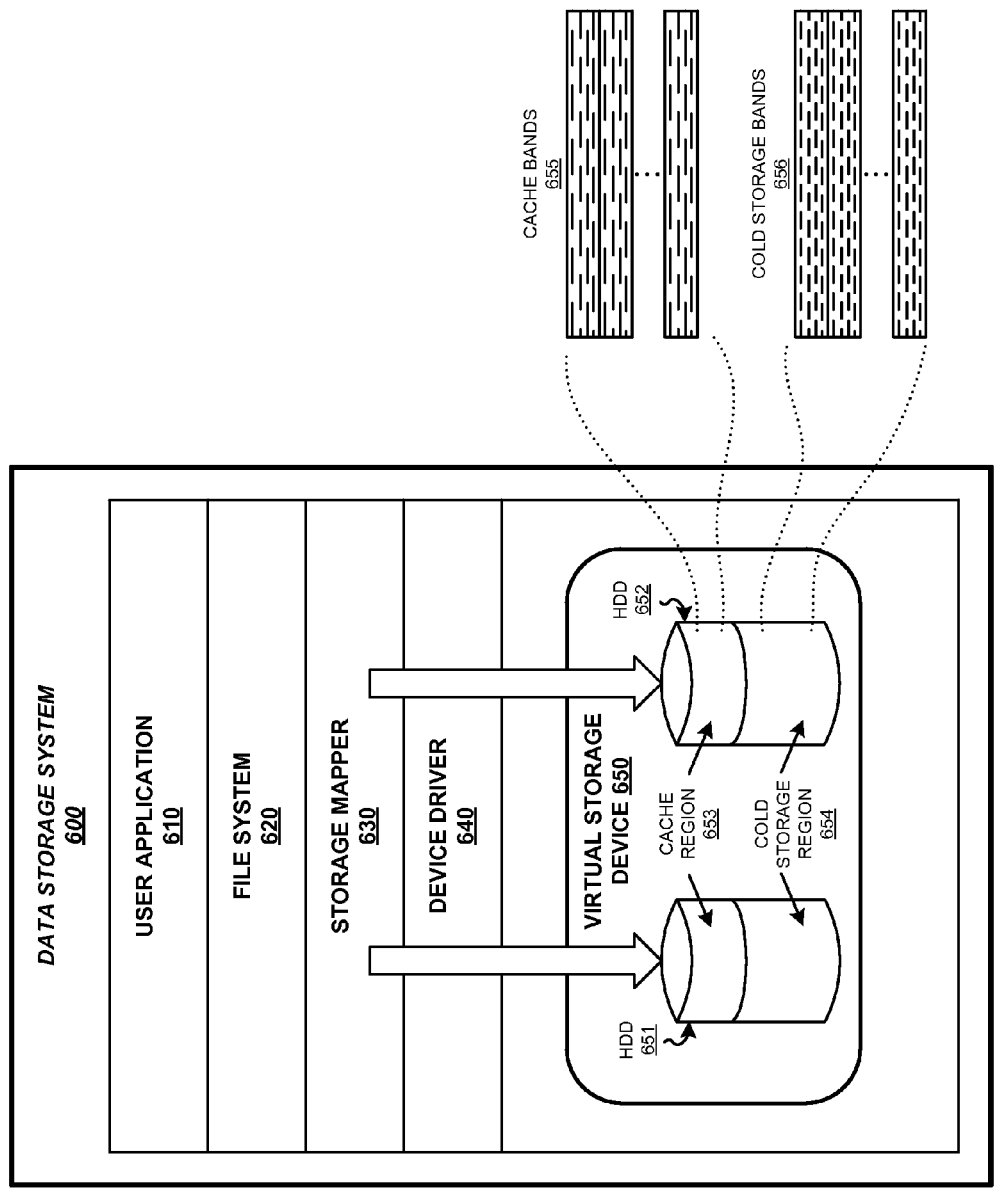
FIG. 6 is a block diagram illustrating a data storage system.

FIG. 6 is a block diagram illustrating data storage system 600. Data storage system 600 can be an example of data storage system 500 of FIG. 5, data system 300 of FIG. 3, or data storage system 110 of FIG. 1, although variations are possible. Data storage system 600 includes user application 610, file system 620, storage mapper 630, and virtual storage device 650. Virtual storage device 650 includes HDD 651 and HDD 652, although further HDDs can be included. Each of the elements of data storage system 600 are communicatively coupled, such as by logical or software interfaces between elements 610-640, or by physical device interfaces for HDDs 651-652.

User application 610 can include any user interface or software interface that a user device or external data system can interface with to instruct data storage system 600 to perform the various storage operations. Application 610 can include a web interface, application programming interface (API), software application, operating system, user application, or other software, including combinations and variations thereof. In many examples, application 610 is presented to a user device or external system through a communication interface. For example, application 610 can be a user interface or API while a communication interface employing a network stack can be used for exchanging data packets with user devices or external systems to interact with application 610. Application 610 can communicate with file system 620 to perform data file or data object operations, such as those mentioned above.

File system 620 can be a CSFS, a network file system (NFS), or a distributed file system (DFS), among other file systems, including combinations thereof. Although CSFS is described herein, it should be understood that other file systems can be employed, such as local file systems, network file systems, distributed file systems, custom file systems, or sequential file systems, including combinations and variations thereof. The file system can track data file or data object allocations so an operating system, application, or other user-level software process can access data stored by any of HDD 651 or 652. In this example, file system 620 provides a virtual storage device 650 that spans more than one HDD. Virtual storage device 650 can be presented to a user device or external system by user application 610 as a single volume of storage. In some examples, virtual storage device 650 can be subdivide into sub-volumes. File system 620 communicates with storage mapper 630 to store data onto various storage devices, such as HDD 651-652.

Storage mapper 630 determines which HDD to use for data storage for each data piece, such as for a particular file or object transaction. Storage mapper 630 can perform load balancing analysis to identify one of HDD 651-652 on which to write data. This load balancing can include round-robin load balancing to alternatively select different HDDs for each transaction. This load balancing can include monitoring a busy or idle state of the HDDs and distribute the write transaction to a HDD which is not in a busy state or which is in an idle state. The busy state can include a HDD presently writing, reading, or verifying data, while the idle state can include a HDD not presently writing, reading, or verifying data. In further examples, the load balancing includes monitoring a current position of a read-write head or read head of a HDD and processing the current head position against a desired write or read location to prevent unwanted head seek and tracking operations and delays. Storage mapper 630 can establish a storage map data structure that maps a first region in HDD 651 as a vendor region or verification cache for a user region or cold storage region of HDD 652, and vice versa. In this example, cache region 653 is provided on each HDD as a verification cache for the other HDD, and cold storage region 654 is provided as a user space for storing user-accessible data.

Storage mapper 630 is also configured to perform a verification process on data written to a cold storage region of a HDD after a verification trigger condition has been met, such as those discussed herein. Storage mapper 630 can identify one or more parts of the data in the cold storage regions of the HDDs that fail to pass a verification process transfer replacement data from the verification cache to supersede the failed data in the cold storage regions.

Also, each HDD 651-652 are shown with storage bands comprising each associated cache region and cold storage region. Cache bands 655 of each cache region 653 employ a less dense storage configuration, such as a perpendicular magnetic recording (PMR) arrangement, while cold storage bands 656 of each cold storage region 654 employ a more dense storage configuration, such as a shingled magnetic recording (SMR) arrangement.

In further examples, an enclosure is employed to house the elements of data storage system 600, such as a rack mount enclosure or modular enclosure. A backup power supply, such as an uninterruptable power supply (UPS) might be omitted from data storage system 600, due in part to a higher reliability of stored data achieved using the verification cache to hold data until it has been completely verified for cold storage. Power interruptions can be less of a concern for data loss when the verification cache is employed.

In yet further examples, data can begin to exceed a fullness threshold of an associated cold storage region of a HDD. This cold storage region can be expanded to include further storage regions, such as storage regions previously used for verification caching. In this manner, a HDD can employ the verification cache and cold storage arrangement until the cold storage arrangement exceeds a fullness threshold. Then, the verification cache can be reduced in size or eliminated altogether to expand the cold storage area for increased storage capacity as the expense of slower operation due to more frequent verification of data stored in the cold storage regions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage system, comprising:
a communication interface configured to receive data for storage in a data storage array comprising a plurality of data storage devices;
a processing system configured to identify at least a portion of a first data storage device as a verification cache for a storage region of a second data storage device, write the data for storage in the verification cache of the first data storage device and write the data for storage in the storage region of the second data storage device;
the processing system configured to perform a verification process on at least the data written to the storage region of the second data storage device after a verification trigger condition has been met, and identify one or more parts of the data in the storage region of the second data storage device that fail to pass the verification process;
responsive to the one or more parts of the data that fail to pass the verification process, the processing system configured to transfer the one or more parts of the data from the verification cache of the first data storage device to supersede the one or more parts of the data in the storage region of the second data storage device
the communication interface configured to receive second data for storage in the data storage array;
the processing system configured to identify at least a portion of the second data storage device as a verification cache for a storage region of the first data storage device, write the second data for storage in the verification cache of the second data storage device and write the second data for storage in the storage region of the first data storage device;

the processing system configured to perform the verification process on at least the second data written to the storage region of the first data storage device after a the verification trigger condition has been met, and identify one or more parts of the second data in the storage region of the first data storage device that fail to pass the verification process; and responsive to the one or more parts of the second data that fail to pass the verification process, the processing system configured to transfer the one or more parts of the second data from the verification cache of the second data storage device to supersede the one or more parts of the second data in the storage region of the first data storage device.

2. The data storage system of claim 1, comprising:
the processing system configured to write the data for storage in the storage region of the second data storage device without performing the verification process on the data until the verification trigger condition has been met.

3. The data storage system of claim 1, wherein the verification trigger condition comprises second data written subsequent to the data for storage in the storage region of the second data storage device.

4. The data storage system of claim 1, wherein the second data storage device comprises a rotating magnetic storage media with a plurality of storage tracks, and wherein the verification trigger condition comprises second data written to a storage track adjacent to the data in the storage region of the second data storage device.

5. The data storage system of claim 1, wherein the storage region of the second data storage device uses a shingled magnetic recording (SMR) arrangement on a rotating magnetic storage media of the second data storage device, and wherein the verification cache of the first data storage device uses a perpendicular magnetic recording (PMR) arrangement on a rotating magnetic storage media of the first data storage device.

6. The data storage system of claim 1, comprising:
the processing system configured to delete the data from the verification cache of the first data storage device if none the data written to the storage region of the second data storage device fails the verification process.

7. The data storage system of claim 1, wherein the verification process comprises checking an error correcting code (ECC) of the data.

8. A method of operating a data storage system, the method comprising:
receiving data for storage in a data storage array comprising a plurality of data storage devices;
identifying at least a portion of a first data storage device as a verification cache for a storage region of a second data storage device, writing the data for storage in the verification cache of the first data storage device and writing the data for storage in the storage region of the second data storage device;
performing a verification process on at least the data written to the storage region of the second data storage device after a verification trigger condition has been met, and identifying one or more parts of the data in the storage region of the second data storage device that fail to pass the verification process;
responsive to the one or more parts of the data that fail to pass the verification process, transferring the one or more parts of the data from the verification cache of the first data storage device to supersede the one or more parts of the data in the storage region of the second data storage device; and wherein the storage region of the second data storage device uses a shingled magnetic recording (SMR) arrangement on a rotating magnetic storage media of the second data storage device, and wherein the verification cache of the first data storage device uses a perpendicular magnetic recording (PMR) arrangement on a rotating magnetic storage media of the first data storage device.

9. The method of claim 8, wherein writing the data for storage in the storage region of the second data storage device comprises writing the data for storage in the storage region of the second data storage device without performing the verification process on the data until the verification trigger condition has been met.

10. The method of claim 8, wherein the verification trigger condition comprises second data written subsequent to the data for storage in the storage region of the second data storage device.

11. The method of claim 8, wherein the second data storage device comprises a rotating magnetic storage media with a plurality of storage tracks, and wherein the verification trigger condition comprises second data written to a storage track adjacent to the data in the storage region of the second data storage device.

12. The method of claim 8, further comprising:
deleting the data from the verification cache of the first data storage device if none the data written to the storage region of the second data storage device fails the verification process.

13. The method of claim 8, wherein the verification process comprises checking an error correcting code (ECC) of the data.

14. The method of claim 8, comprising:
receiving second data for storage in the data storage array;
identifying at least a portion of the second data storage device as a verification cache for a storage region of the first data storage device, writing the second data for storage in the verification cache of the second data storage device and writing the second data for storage in the storage region of the first data storage device;
performing the verification process on at least the second data written to the storage region of the first data storage device after a the verification trigger condition has been met, and identifying one or more parts of the second data in the storage region of the first data storage device that fail to pass the verification process; and
responsive to the one or more parts of the second data that fail to pass the verification process, transferring the one or more parts of the second data from the verification cache of the second data storage device to supersede the one or more parts of the second data in the storage region of the first data storage device.

15. A data storage system, comprising:
a storage application configured to receive data for storage in a cold storage file system, the cold storage file system comprising one or more data storage devices presented as a virtual storage device that spans the one or more data storage devices;
a storage mapper configured to establish a storage map data structure that maps a first region in a first data storage device as a verification cache for a cold storage region of a second data storage device and maps a second region of the second data storage device as a verification cache for a cold storage region of the first data storage device;

responsive to receiving the data, the storage mapper configured to select the cold storage region of the second data storage device for storage of the data, transfer the data for caching in the verification cache of the first data storage device, and transfer the data for storage in the cold storage region of the second data storage device;

after at least further data is stored in the cold storage region of the second data storage device, the storage mapper configured to perform a verification process on at least the data written to the cold storage region of the second data storage device, and identify one or more parts of the data in the cold storage region of the second data storage device that fail to pass the verification process; and responsive to the one or more parts of the data that fail to pass the verification process, the storage mapper configured to transfer the one or more parts of the data from the verification cache of the first data storage device to supersede the one or more parts of the data in the cold storage region of the second data storage device.

16. The data storage system of claim 15, wherein the cold storage region of the second data storage device comprises a plurality of storage bands each comprising one or more sequential storage tracks of a rotating magnetic media of the second data storage device, and wherein the verification cache in the second data storage device comprises one or more storage tracks of the rotating magnetic media of the second data storage device nearer to an outside edge of the rotating magnetic media than the one or more sequential storage tracks of the cold storage region in the second data storage device.

17. The data storage system of claim 15, comprising:
responsive to the cold storage region of the second data storage device exceeding a fullness threshold, the storage mapper configured to reallocate at least a portion of the verification cache in the second data storage device into the cold storage region in the second data storage device.

18. The data storage system of claim 15, wherein the storage mapper is configured to select the cold storage region of the second data storage device for storage of the data instead of the cold storage region of the first data storage device based at least on a present loading of the first data storage device and the second data storage device.

* * * * *